(12) United States Patent
Kimura et al.

(10) Patent No.: US 10,363,888 B2
(45) Date of Patent: Jul. 30, 2019

(54) WIRE HARNESS

(71) Applicant: YAZAKI CORPORATION, Tokyo (JP)

(72) Inventors: Osamu Kimura, Shizuoka (JP); Yoshinori Matsushita, Shizuoka (JP); Yasuhiro Okamoto, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 323 days.

(21) Appl. No.: 15/221,287

(22) Filed: Jul. 27, 2016

(65) Prior Publication Data

US 2017/0028945 A1 Feb. 2, 2017

(30) Foreign Application Priority Data

Jul. 31, 2015 (JP) .................... 2015-151480

(51) Int. Cl.
*B60R 16/02* (2006.01)
*B60R 16/033* (2006.01)
*H01B 7/00* (2006.01)

(52) U.S. Cl.
CPC ...... *B60R 16/0215* (2013.01); *B60R 16/0207* (2013.01); *B60R 16/033* (2013.01); *H01B 7/0045* (2013.01)

(58) Field of Classification Search
CPC ............ B60R 16/0215; B60R 16/0207; B60R 16/033; H01B 7/0045; H01B 7/17; H01B 7/18
See application file for complete search history.

(56) References Cited

U.S. PATENT DOCUMENTS

2005/0011687 A1   1/2005  Yamaguchi et al.
2009/0294149 A1*  12/2009 Watanabe ............... H01B 7/16
                                                174/102 R
2013/0168149 A1*  7/2013  Gundel ................ H01B 7/0861
                                                174/350

FOREIGN PATENT DOCUMENTS

| JP | 2003-143734 A | 5/2003 |
| JP | 2004-224156 A | 8/2004 |
| JP | 2012-95030 A  | 5/2012 |
| JP | 2013-191409 A | 9/2013 |
| WO | 2008/062885 A1 | 5/2008 |

OTHER PUBLICATIONS

Japanese Office Action for the related Japanese Patent Application No. 2015-151480 dated Jul. 18, 2017.
Japanese Office Action for the related Japanese Patent Application No. 2015-151480 dated Dec. 5, 2017.
Japanese Office Action for the related Japanese Patent Application No. 2015-151480 dated May 8, 2018.

* cited by examiner

*Primary Examiner* — Timothy J Thompson
*Assistant Examiner* — Amol H Patel
(74) *Attorney, Agent, or Firm* — Kenealy Vaidya LLP

(57) ABSTRACT

A wire harness to be installed in a vehicle includes an electric wire and a protective tube that protects the electric wire. The electric wire is provided at the lower part of a vehicle body of the vehicle and the protective tube covers the electric wire and includes ferromagnetic materials.

5 Claims, 9 Drawing Sheets

| PROTECTIVE TUBE MATERIAL | IRON | FERRITE |
|---|---|---|
| RELATIVE MAGNETIC PERMEABILITY [mm] | 5000 | 2300 |
| PROTECTIVE TUBE THICKNESS [mm] | 2 | |
| PROTECTIVE TUBE LENGTH [mm] | 2000 | |
| INSULATOR THICKNESS [mm] | 1 | |

| PROTECTIVE TUBE MATERIAL | IRON | FERRITE |
|---|---|---|
| RELATIVE MAGNETIC PERMEABILITY [mm] | 5000 | 2300 |
| ELECTRIC WIRE THICKNESS [mm] | 4 | |
| INSULATOR THICKNESS [mm] | 1 | |
| PROTECTIVE TUBE THICKNESS [mm] | 7 | |
| DISTANCE D BETWEEN PROTECTIVE TUBE AND ELECTRIC WIRE [mm] | 0 | |

WIRE HARNESS

CROSS REFERENCE TO RELATED APPLICATIONS

This application claims a benefit of Japanese Patent Application (No. 2015-151480) filed on Jul. 31, 2015, the contents of which are incorporated herein by reference.

BACKGROUND OF THE INVENTION

1. Technical Field

The present invention relates to a wire harness.

2. Related Art

Traditionally, various wire harnesses are wired in a vehicle. For example, an inverter and a motor generator are connected through the wire harness. The wire harness is inserted through a metal protective pipe under a floor, and, in an engine compartment, is inserted through an iron flexible tube (for example, refers to JP-A-2004-224156.

However, in the technique described in the patent document 1, since the iron flexible tube is used, the distance between the iron flexible tube and the electric wire changes by, for example, vibration which happens when the vehicle is running. Thereby, because unexpected capacity component and inducing component might occur around the electric wire, the technique described in the patent document 1 is not such a technique that while the electric wire is protected, the tube can be used as an inductor.

The present invention is made in view of such circumstances, and the object of the present invention is to provide a wire harness so that while the electric wire is protected, the wire harness can be used as an inductor.

SUMMARY

[1] According to an aspect of the invention, a wire harness to be installed in a vehicle includes an electric wire and a protective tube that protects the electric wire. The electric wire is provided at the lower part of a vehicle body of the vehicle, and the protective tube covers the electric wire and includes ferromagnetic materials.

With the configuration of [1], protecting the electric wire, the wire harness can be used as an inductor.

[2] In the wire harness of [1], the vehicle is provided with a battery and an inverter, the electric wire includes a conductor that connects the inverter to the battery and an insulator that covers the conductor, and the protective tube includes an inner member that has a shape along the electric wire and an outer member that covers the inner member.

With the configuration of [2], the inductance that occurs between the protective tube and the electric wire can be increased greatly.

[3] In the wire harness of [1], the vehicle is provided with a battery and an inverter, the electric wire includes a conductor that connects the inverter to the battery and an insulator that covers the conductor, and the protective tube has a polygonal tube.

With the configuration of [3], the wire harness is lightweight and it becomes easy to handle the wire harness.

According to the present invention, because a protective tube covers the electric wire and includes ferromagnetic materials, such a wire harness can be provided that while the electric wire is protected, the wire harness can be used as an inductor.

DETAILED DESCRIPTION OF EMBODIMENTS

First Embodiment

Figure 1:
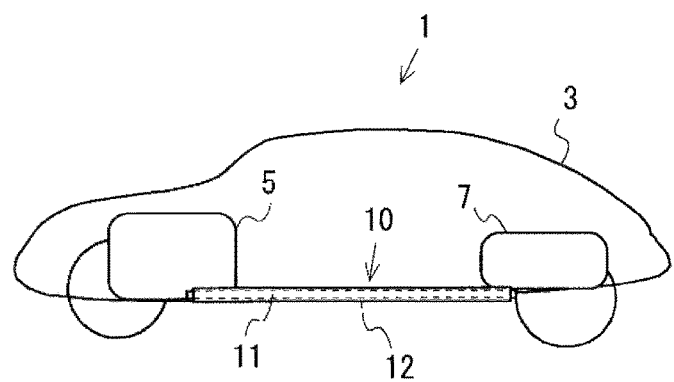
FIG. 1 is a figure which shows an example in which a wire harness 10 according to a first embodiment is wired to a vehicle 1.

FIG. 1 is a figure which shows an example in which a wire harness 10 according to a first embodiment is wired to a vehicle 1. The vehicle 1 shown in FIG. 1 includes an inverter 5 and a battery 7 inside a vehicle body 3 of the vehicle 1, and the inverter 5 and the battery 7 are connected through the wire harness 10. The battery 7 supplies stable DC power, and, for example, is a rechargeable battery such as a lithium ion battery.

The wire harness 10 includes an electric wire 11 and a protective tube 12. The electric wire 11 is electrically connected between the battery 7 and the inverter 5, and functions as a medium that transmits electrical power or signal. The electric wire 11 is provided at the lower part of the vehicle body 3.

The protective tube 12 protects the electric wire 11. The protective tube 12 covers the electric wire 11 and includes ferromagnetic materials. The protective tube 12 is provided to prevent damage of the electric wire 11 because of flying stones or contact. The protective tube 12 covers the electric wire 11, but is not electrically connected to the inverter 5 and the battery 7. It is not necessary that the protective tube 12 is electrically connected to the circuit including the inverter 5 and the battery 7.

Figure 2:
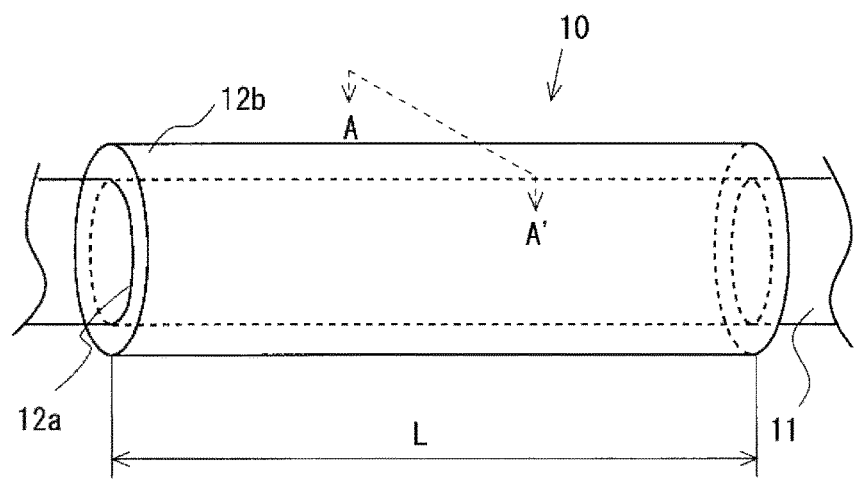
FIG. 2 is a figure which shows a constitution example of the wire harness 10 according to the first embodiment.
Figure 3:
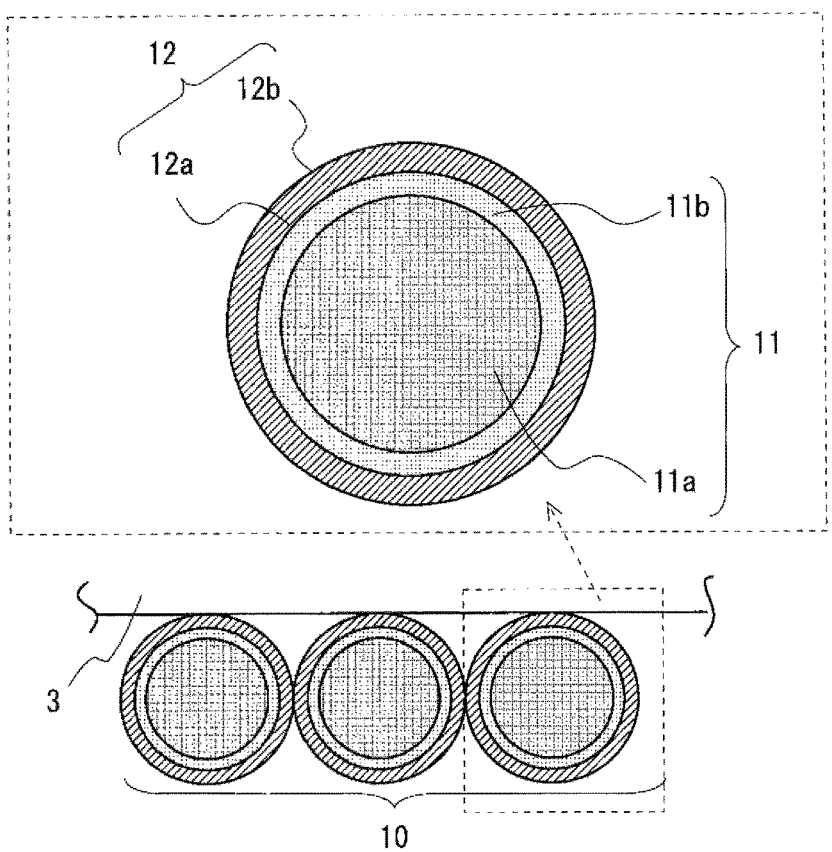
FIG. 3 is a figure which shows the cross section of the wire harness 10 along an A-A' line of FIG. 2 according to the first embodiment.

Then, the wire harness 10 is described in detail. FIG. 2 is a figure which shows a constitution example of the wire harness 10 according to the first embodiment. As shown in FIG. 2, FIG. 3 is a figure which shows the cross section of the wire harness 10 along an A-A' line of FIG. 2 according to the first embodiment.

As shown in FIGS. 2 and 3, the electric wire 11 includes a conductor 11a and an insulator 11b. The conductor 11a connects the inverter 5 to the battery 7. The insulator 11b covers the conductor 11a. Since the conductor 11a ties various devices like the battery 7 and the inverter 5 and transmits electrical power or signal, if the electric wire 11 is damaged by external causes, and the electrical power or signal is not transmitted, the running of the vehicle 1 might be adversely affected.

Thus, as shown in FIGS. 1 to 3, when the protective tube 12 covers the electric wire 11 and protects the electric wire 11, the electric wire 11 is protected by the protective tube 12 and the damage of the electric wire 11 by the external causes is avoided.

Specifically, as shown in FIG. 3, the protective tube 12 includes an inner member 12a and an outer member 12b. The inner member 12a has a shape along the electric wire 11, and closely covers the insulator 11b. On the other hand, the outer member 12b covers the inner member 12a, and is formed integrally with the inner member 12a.

Figures 4, 5:
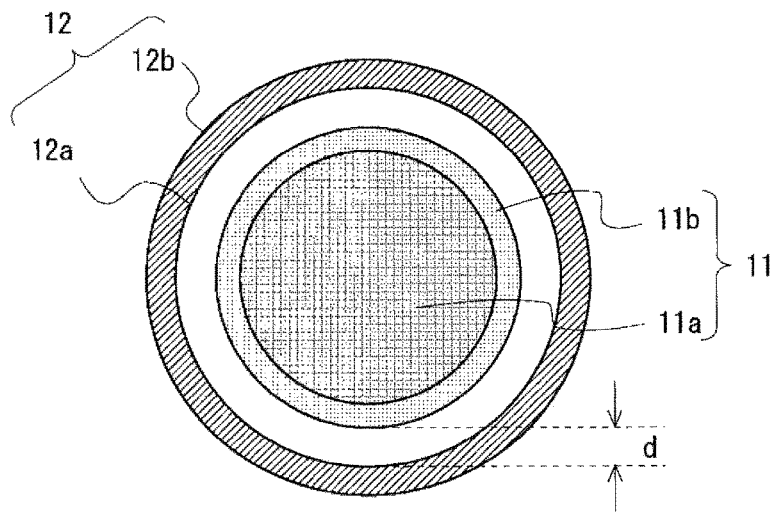
FIG. 4 is a figure which describes an example of the material of a protective tube 12 according to the first embodiment.
FIG. 5 is a figure which shows a distance d between the protective tube 12 and the electric wire 11 according to the first embodiment.

Then, the relation of the material of the protective tube 12 and the distance d between the protective tube 12 and the electric wire 11 is described. FIG. 4 is a figure which describes an example of the material of the protective tube 12 according to the first embodiment. As shown in FIG. 4, it is assumed that the thickness of the protective tube 12 is 2 (mm), the length of the protective tube 12 is 2000 (mm), and the thickness of the insulator 11b of the electric wire 11 is 1 (mm). In this case, if the material of the protective tube 12 is iron, the relative magnetic permeability is 5000, and if the material of the protective tube 12 is ferrite, the relative magnetic permeability is 2300.

Figures 6, 7:
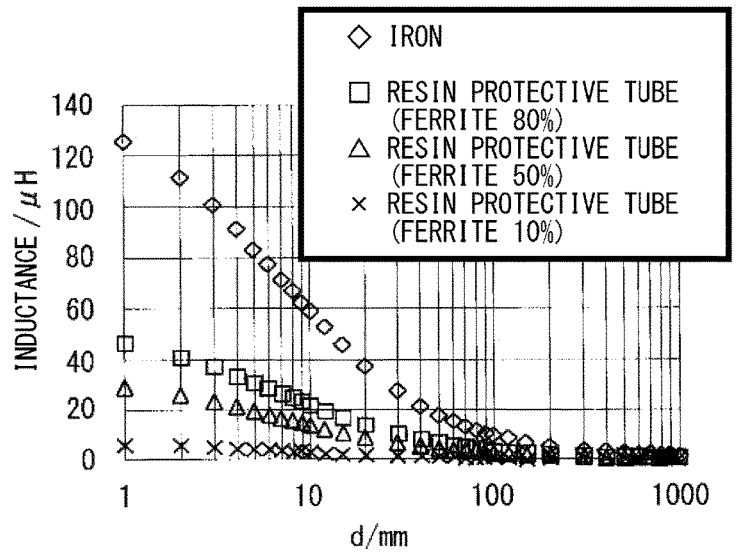
FIG. 6 is a figure which shows the relation of the distance d between the protective tube 12 and the electric wire 11 according to the first embodiment, and inductance for each material of the protective tube 12.
FIG. 7 is a figure which shows a size example of the electric wire 11 and the protective tube 12 when the distance d between the protective tube 12 and the electric wire 11 according to the first embodiment is zero.

FIG. 5 is a figure which shows the distance d between the protective tube 12 and the electric wire 11 according to the first embodiment. A change of the inductance as the distance d of FIG. 5 is changed is described by using FIG. 6. FIG. 6 is a figure which shows the relation of the distance d between the protective tube 12 and the electric wire 11 according to the first embodiment, and the inductance for each material of the protective tube 12.

As shown in FIG. 6, as the distance d between the protective tube 12 and the electric wire 11 is increased, the inductance becomes small. Further, as the distance d between the protective tube 12 and the electric wire 11 is decreased or as the protective tube 12 becomes adhered to the electric wire 11, the inductance becomes large. Thus, for the same diameter of the electric wire 11, if the cross section of the protective tube 12 has a round shape, the protective tube 12 can be closest to the electric wire 11. Thus, a round shape is desirable for the shape of the protective tube 12 to raise inductance. The protective tube 12 may have such a shape as a rectangular shape or triangular shape, but the distance d between the electric wire 11 and the protective tube 12 get longer partially in comparison with a round shape. Thus, for the same length of the protective tube 12, the inductance is decreased. As shown in FIG. 6, the inductance increases as the content of ferrite increases. That is, the inductance increases as the content of magnetic substance increases.

Figure 8:
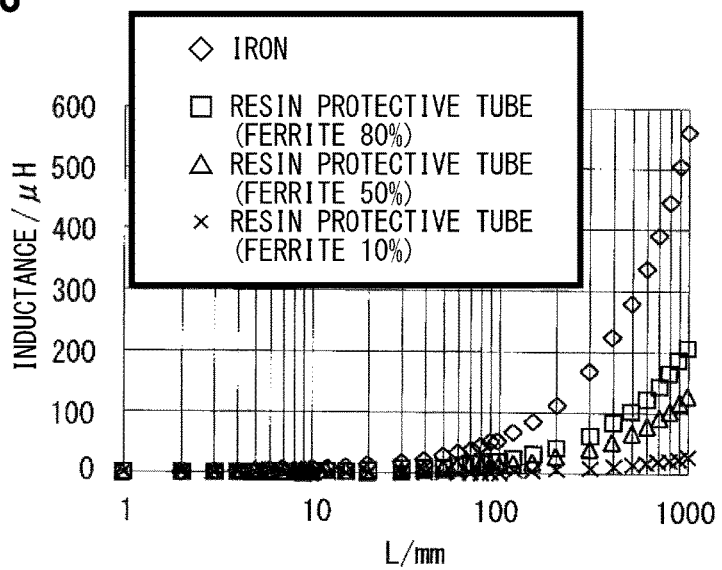
FIG. 8 is a figure which shows the relation of the length of the protective tube 12 according to the first embodiment and the inductance for each material of the protective tube 12.

Then, the relation of the material of the protective tube 12 and the distance d between the protective tube 12 and the electric wire 11 when the protective tube 12 and the electric wire 11 are adhered is described. FIG. 7 is a figure which shows a size example of the electric wire 11 and the protective tube 12 when the distance d between the protective tube 12 and the electric wire 11 according to the first embodiment is zero. FIG. 8 is a figure which shows the relation of the length of the protective tube 12 according to the first embodiment and the inductance for each material of the protective tube 12.

As shown in FIG. 8, as the protective tube 12 gets longer, the inductance increases. From the above, depending on necessary inductance, the material of the protective tube 12, the content of magnetic substance, and the distance d between the electric wire 11 and the protective tube 12 are set.

Figure 9:
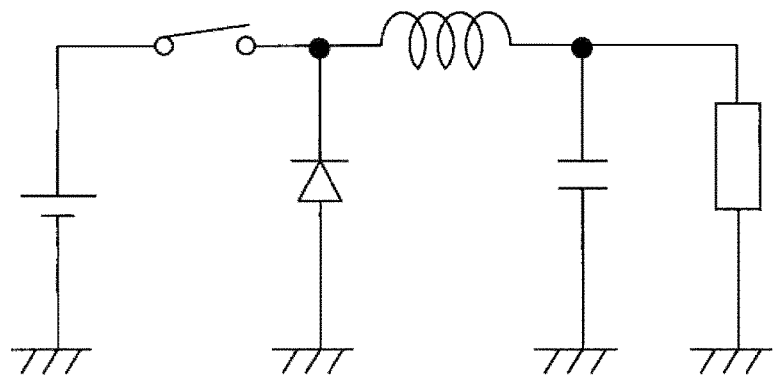
FIG. 9 is a figure which shows an example in which the inductor of the protective tube 12 according to the first embodiment is used in a step-down chopper circuit.

Then, an example of making the protective tube 12 function as an inducing component of circuit elements is described. FIG. 9 is a figure which shows an example in which the inductor of the protective tube 12 according to the first embodiment is used in a step-down chopper circuit.

The step-down chopper circuit of FIG. 9 includes a power supply, a switch, a diode, an inductor, a capacitor, and a load. Here, the inductor is an inducing component of the protective tube 12. Because the step-down chopper circuit can be readily understood by those skilled in the art, the detailed description of the step-down chopper circuit is omitted, but when the ON/OFF of the switch is changed repeatedly, a smoothing process is carried out by the characteristic of the inductor, and the voltage is applied to the load from the capacitor. Since the action is a step-down chopper action, the voltage applied from the capacitor becomes smaller than the voltage applied from the power supply.

From the above, for the wire harness 10 according to the first embodiment, while the electric wire 11 is protected by the protective tube 12, which includes ferromagnetic materials that covers the electric wire 11, the protective tube 12 can be used as an inductor.

Since the inner member 12a of the protective tube 12 has a shape along the electric wire 11, the distance d from the electric wire 11 can be zero. Thereby, the inductance that occurs between the protective tube 12 and the electric wire 11 can be increased greatly.

Second Embodiment

Figure 10:
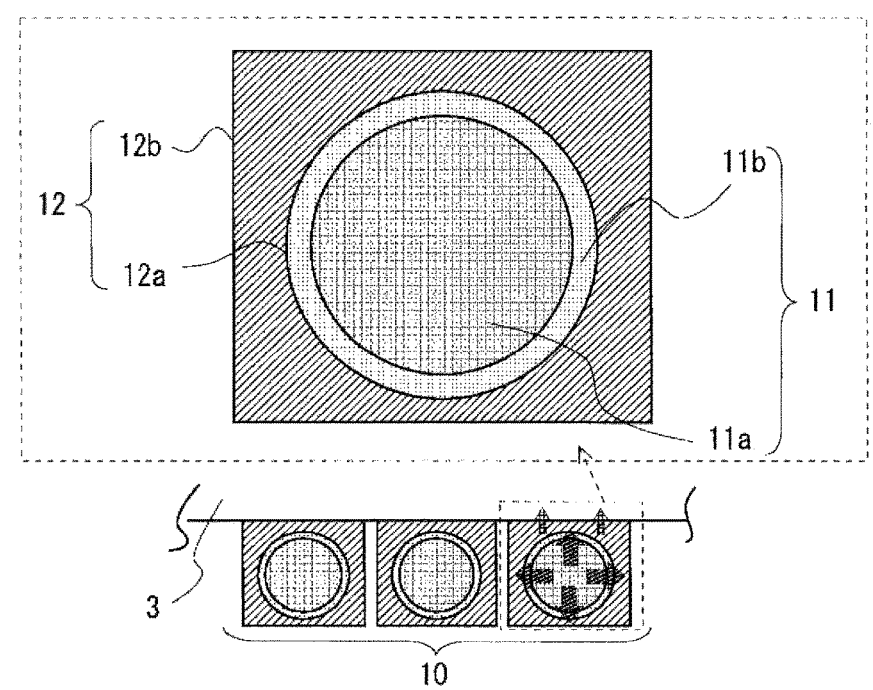
FIG. 10 is a figure which shows an example of the protective tube 12 according to a second embodiment.

FIG. 10 is a figure which shows an example of the protective tube 12 according to the second embodiment. In the second embodiment, the same components as those in the first embodiment are given the same signs, and their description is omitted.

As shown in FIG. 10, the protective tube 12 is adhered to the electric wire 11, and is integrally formed with an inner member 12a and an outer member 12b, whose shape is different from that of the inner member 12a. Specifically, for the protective tube 12, the inner member 12a has a shape along the electric wire 11, and the outer member 12b covers the inner member 12a More specifically, the inner member 12a has a round shape, the outer member 12b has a polygonal shape, and the inner member 12a is formed integrally with the outer member 12b.

From the above, for the protective tube 12 according to the second embodiment, the inductance value is easy to be raised, and heat of the electric wire 11 is easy to be radiated. Thus, because it is easy to dissipate the heat from the electric wire 11 to the protective tube 12, it is easy to dissipate the heat of the electric wire 11 to the vehicle body 3. Further, because the outer member 12b has a polygonal shape, when protective tubes 12 are placed side by side, the protective tubes 12 can be placed without a gap. Thus, not only the placing space can be utilized effectively, but also air can be prevented from being disturbed when the vehicle 1 is running.

Third Embodiment

Figure 11:
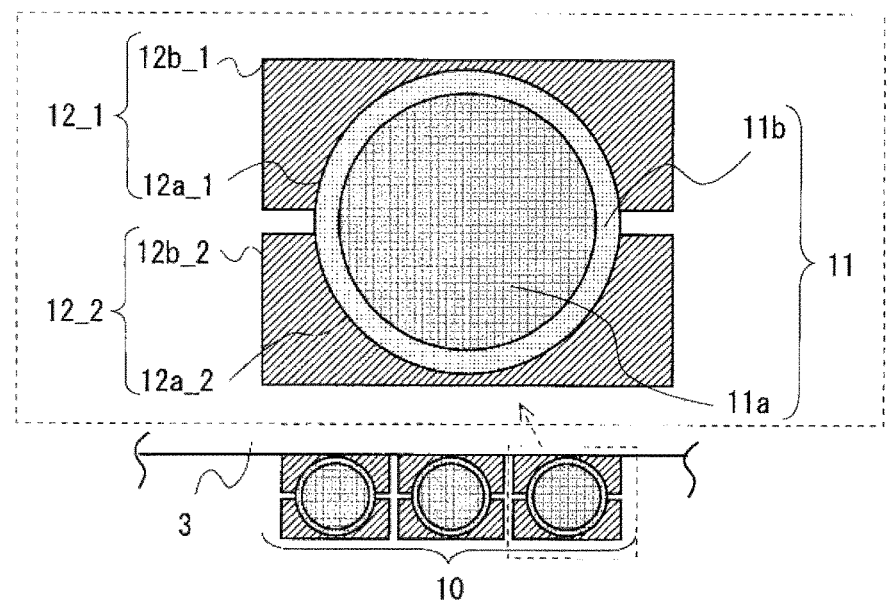
FIG. 11 is a figure which shows an example of the protective tube 12 according to a third embodiment.

FIG. 11 is a figure which shows an example of protective tubes 12_1 and 12_2 according to a third embodiment. In the third embodiment, the same components as those in the first embodiment and the second embodiment are given the same signs, and their description is omitted.

As shown in FIG. 11, parts of the protective tubes 12_1 and 12_2 are adhered to the electric wire 11, and the protective tube 12_1 and the protective tube 12_2 can be divided. Specifically, the protective tube 12_1 is formed integrally with an inner member 12a_1 and an outer member 12b_1, which has a shape different from that of the inner member 12a_1. The inner member 12a_1 includes a shape along the electric wire 11, and the outer member 12b_1 covers the inner member 12a_1. More specifically, the inner member 12a_1 has a curved shape, the outer member 12b_1 has a polygonal shape, and the inner member 12a is formed integrally with the outer member 12b. Because the protective tube 12_2 has the same structure as that of the protective tube 12_1, the description of the protective tube 12_2 is omitted.

From the above, for the protective tubes 12_1, 12_2 according to the third embodiment, the inductance value is easy to be raised, and heat of the electric wire 11 is easy to be radiated. Thus, because it is easy to dissipate the heat from the electric wire 11 to the protective tube 12, it is easy to dissipate the heat of the electric wire 11 to the vehicle body 3. Further, because the outer member 12b has a polygonal shape, when protective tubes 12 are placed side by side, the protective tubes 12 can be placed without a gap. Thus, not only the placing space can be utilized effectively, but also air can be prevented from being disturbed when the vehicle 1 is running. Furthermore, because the protective tube 12 is divided into the protective tube 12_1 and the protective tube 12_2, the protective tube 12 is removable and repairable.

Fourth Embodiment

Figure 12:
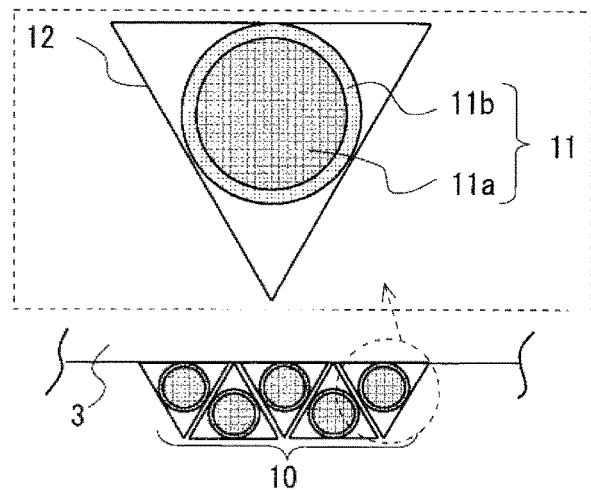
FIG. 12 is a figure which shows an example of the protective tube 12 according to a fourth embodiment.

FIG. 12 is a figure which shows an example of the protective tube 12 according to a fourth embodiment. In the fourth embodiment, the same components as those in the first embodiment to the third embodiment are given the same signs, and their description is omitted.

As shown in FIG. 12, the protective tube 12 includes a polygonal tube, and specifically, the protective tube 12 includes a member of a triangular shape, and a constant gap from the electric wire 11 is formed.

Thus, because the protective tube 12 according to the fourth embodiment is lightweight, it becomes easy to handle the protective tube 12. For example, if the protective tube 12 is formed of resin including ferromagnetic materials, the protective tube 12 is not only lightweight, but also strong in strength.

Fifth Embodiment

Figure 13:
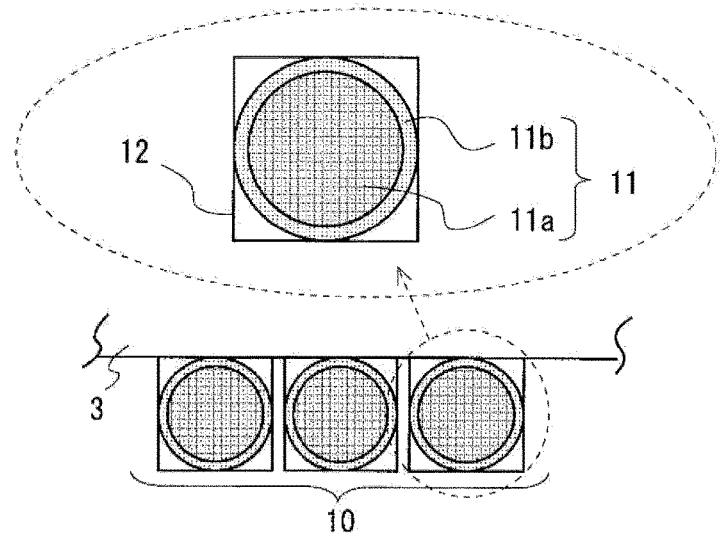
FIG. 13 is a figure which shows an example of the protective tube 12 according to a fifth embodiment.

FIG. 13 is a figure which shows an example of the protective tube 12 according to a fifth embodiment. In the fifth embodiment, the same components as those in the first embodiment to the fourth embodiment are given the same signs, and their description is omitted.

As shown in FIG. 13, the protective tube 12 includes a polygonal tube, and specifically, the protective tube 12 includes a member of a square shape, and a constant gap from the electric wire 11 is formed.

Thus, because the protective tube 12 according to the fifth embodiment is lightweight, it becomes easy to handle the protective tube 12. For example, if the protective tube 12 is formed of resin including ferromagnetic materials, the protective tube 12 is not only lightweight, but also strong in strength.

Sixth Embodiment

Figure 14:
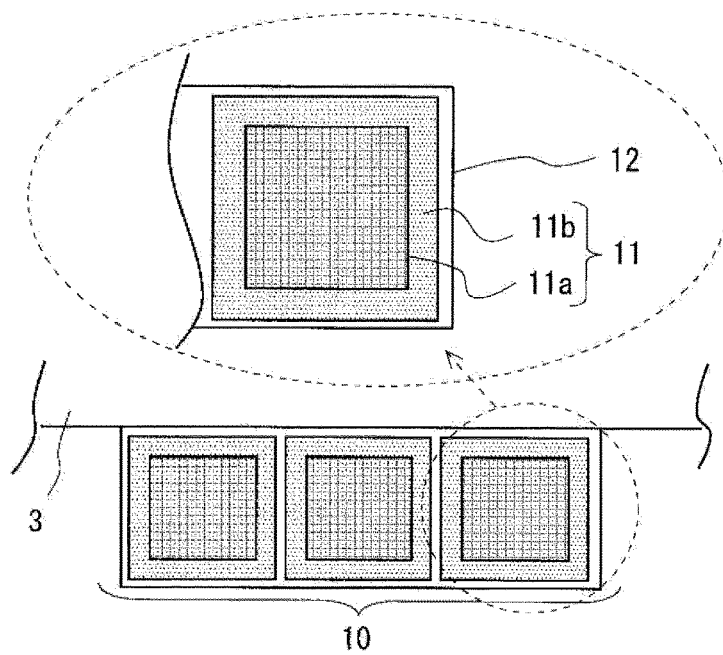
FIG. 14 is a figure which shows an example of the protective tube 12 according to a sixth embodiment.

FIG. 14 is a figure which shows an example of the protective tube 12 according to a sixth embodiment. In the sixth embodiment, the same components as those in the first embodiment to the fifth embodiment are given the same signs, and their description is omitted.

As shown in FIG. 14, the protective tube 12 includes a polygonal tube, and specifically, the protective tube 12 includes a member of a rectangular shape, and a constant gap from the electric wire 11 is formed. The electric wire 11 of FIG. 14 has a quadrangular shape.

Thus, because the protective tube 12 according to the sixth embodiment is lightweight, it becomes easy to handle the protective tube 12. For example, if the protective tube 12 is formed of resin including ferromagnetic materials, the protective tube 12 is not only lightweight, but also strong in strength.

Seventh Embodiment

Figure 15:
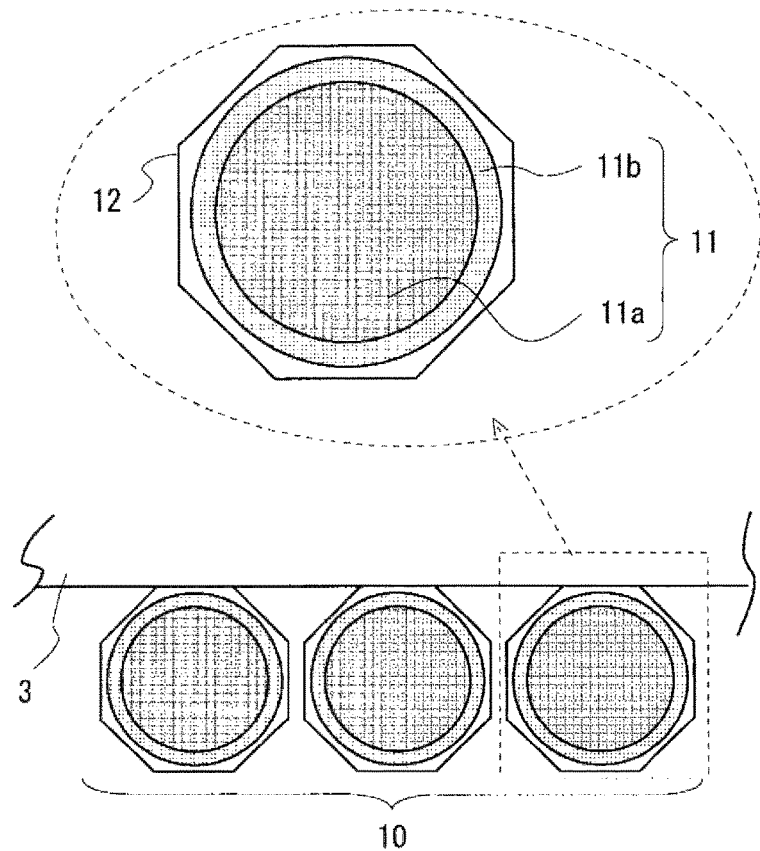
FIG. 15 is a figure which shows an example of the protective tube 12 according to a seventh embodiment.

FIG. 15 is a figure which shows an example of the protective tube 12 according to a seventh embodiment. In the seventh embodiment, the same components as those in the first embodiment to the sixth embodiment are given the same signs, and their description is omitted.

As shown in FIG. 15, the protective tube 12 includes a polygonal tube, and specifically, the protective tube 12 includes a member of an octagonal shape, and a constant gap from the electric wire 11 is formed.

Thus, because the protective tube 12 according to the seventh embodiment is lightweight, it becomes easy to handle the protective tube 12. For example, if the protective tube 12 is formed of resin including ferromagnetic materials, the protective tube 12 is not only lightweight, but also strong in strength.

Although the present invention has been described based on the embodiments, the present invention is not limited to the above embodiments, and modifications may be made without departing from the scope and spirit of the invention.

For example, it is described in the first embodiment to seventh embodiment as an example that one electric wire 11 is inserted into the protective tube 12, but, the present invention is not limited to this, and it is also possible that a plurality of electric wires 11 may be inserted into the protective tube 12.

In addition, in the first embodiment, a step-down chopper circuit is described as an example to use the protective tube 12 as an inducing component, but the present invention is not limited to this, and a voltage increasing chopper circuit may be possible. That is, the protective tube 12 according to the first embodiment can be used as an inducing component of the circuit element.

What is claimed is:

1. A wire harness to be installed in a vehicle comprising:
an electric wire; and
a protective tube that protects the electric wire,
wherein the electric wire is provided at a lower part of a vehicle body of the vehicle,
the protective tube covers the electric wire and includes ferromagnetic and resin materials, and
content of the ferromagnetic material and a distance between the electric wire and the protective tube are designed according to a required inductance of the protective tube.

2. The wire harness according to claim 1, wherein the vehicle is provided with a battery and an inverter, the electric wire includes:
a conductor that connects the inverter to the battery; and
an insulator that covers the conductor, and
the protective tube includes:
an inner member that has a shape along the electric wire; and
an outer member that covers the inner member.

3. The wire harness according to claim 1, wherein the vehicle is provided with a battery and an inverter, the electric wire includes:
a conductor that connects the inverter to the battery; and
an insulator that covers the conductor, and
the protective tube has a polygonal tube.

4. The wire harness according to claim 1, wherein the protective tube includes an inner member having a round shape along the electric wire and an outer member that covers the inner member and having a polygonal shape.

5. A wire harness to be installed in a vehicle comprising:
an electric wire; and
a protective tube that protects the electric wire,
wherein the electric wire is provided at a lower part of a vehicle body of the vehicle,
wherein the protective tube covers the electric wire and includes ferromagnetic and resin materials,
wherein the protective tube is an inductor in a step-down chopper circuit that includes a power source, a switch, a diode, the inductor, a capacitor, and a load,
wherein the switch is connected in series between the power source and the inductor, each of the diode, the capacitor, the load are connected in parallel to the switch, and
wherein the inductor is connected in series between the switch and the capacitor.

* * * * *